United States Patent [19]
Watanabe

[11] Patent Number: 5,684,370
[45] Date of Patent: Nov. 4, 1997

[54] CONTROL UNIT AND METHOD WHICH VARY THE OUTPUT VOLTAGE OF AN AC GENERATOR BASED ON A DETECTED DUTY RATIO

[75] Inventor: Hirofumi Watanabe, Tokyo-to, Japan

[73] Assignee: Mitsubishi Denki Kabushiki Kaisha, Tokyo, Japan

[21] Appl. No.: 554,493

[22] Filed: Nov. 7, 1995

[30] Foreign Application Priority Data

Jun. 5, 1995 [JP] Japan ..................... 7-137648

[51] Int. Cl.⁶ ..................................... H02F 5/00
[52] U.S. Cl. .............. 318/151; 318/139; 307/10.1; 315/77
[58] Field of Search .................... 318/139, 151, 318/152, 145, 440, 442; 307/9.1, 10.1, 10.3, 10.7; 315/77, 78, 79, 82; 322/7, 8, 9, 21, 28

[56] References Cited

U.S. PATENT DOCUMENTS

| | | |
|---|---|---|
| 4,320,308 | 3/1982 | Iwasaki ..................... 307/106 |
| 4,670,704 | 6/1987 | Maehara et al. .................. 322/8 |
| 4,749,935 | 6/1988 | Osborne .......................... 322/8 |
| 4,968,917 | 11/1990 | Harris ........................... 315/77 |
| 5,381,074 | 1/1995 | Rudzewicz et al. .............. 315/77 |
| 5,408,203 | 4/1995 | Okano ......................... 323/222 |
| 5,552,642 | 9/1996 | Dougherty et al. .......... 307/10.3 |

FOREIGN PATENT DOCUMENTS

| | | |
|---|---|---|
| 64144 | 4/1987 | Japan . |
| 160043 | 7/1987 | Japan . |

*Primary Examiner*—Jonathan Wysocki
*Attorney, Agent, or Firm*—Sughrue,Mion,Zinn,Macpeak & Seas, PLLC

[57] ABSTRACT

To improve charging efficiency of a storage battery and extend the service life of each of vehicle laps, the output voltage of a generator is adjusted to a first voltage value (13.5 V, for example) without grounding a voltage dividing point B when the duty ratio for turning on or off a field current detected by a detector is lower than a predetermined value and to a second voltage value (14.5 V, for example) by grounding the point B when the detected duty ratio is higher than the predetermined value.

8 Claims, 5 Drawing Sheets

FIG. 2

|  | DF ≤ DF1 | | DF ≧ DF1 | |
|---|---|---|---|---|
|  | LAMP TURNED ON | LAMP TURNED OFF | LAMP TURNED ON | LAMP TURNED OFF |
| REGULATED VOLTAGE | 13.5 V (FIRST REGULATED VOLTAGE) | 14.5 V (SECOND REGULATED VOLTAGE) | 14.5 V (SECOND REGULATED VOLTAGE) | 14.5 V (SECOND REGULATED VOLTAGE) |

CONTROL UNIT AND METHOD WHICH VARY THE OUTPUT VOLTAGE OF AN AC GENERATOR BASED ON A DETECTED DUTY RATIO

BACKGROUND OF THE INVENTION

1. Field of the Invention

This invention relates to a control unit for switching the output voltage of an AC generator between a first regulated voltage value and a second regulated voltage value higher than the first regulated voltage value.

2. Description of the Prior Art

FIG. 5 is a circuit diagram of a conventional AC generator control unit for use in a vehicle disclosed in JP-A-64144/1987 (the term "JP-A" as used herein means an "unexamined published Japanese patent application"). In FIG. 5, reference numeral 1 represents an AC generator driven by an engine and including armature coils 101 and a field coil 102. Numeral 2 represents a rectifier for rectifying all the frequency waves of the AC outputs of the AC generator 1 and having a positive output terminal 201, an auxiliary output terminal 202 and a grounded negative output terminal 203. Numeral 3 represents a voltage regulator for controlling the output voltage of the AC generator 1 to a predetermined value, which comprises resistors 301, 302 and 303 connected in series, transistors 305 and 307, base resistors 304 and 311 for the transistor 305, a Zener diode 306, an output transistor 309, a base resistor 308 for this output transistor 309, and a flywheel diode 310. The Zener diode 306 becomes conductive or non-conductive according to the output voltage of a storage battery 5 detected by the divided voltage resistors 301 to 303, the transistor 307 is turned on or off thereby, and the output transistor 309 is also turned on or off by the ON/OFF operation of the transistor 307, whereby a field current running through the field coil 102 is duty-controlled (controlled intermittently). Meanwhile, the transistor 305 is turned on or off according to an output signal from lamp detection means 4 and the flywheel diode 310 regenerates back electromotive force generated in the field coil 102 by the ON/OFF operation of the output transistor 309 so as to absorb a surge and improve energy efficiency. The above lamp detection means 4 is formed of a transistor 402 connected to a lamp switch 7 through a base resistor 401 disposed on the side of a lamp 6 as a vehicle lamp load. The lamp switch 7 is a switch for lighting a lamp 6 such as a small lamp or indicator lamp around the dashboard of a vehicle, side marker lamp, or tail lamp at night.

A description is subsequently given of the operation of the above conventional unit. When the lamp switch 7 is off, the output of the lamp detection means 4 becomes high (high potential). Thereby, the transistor 305 becomes conductive and a circuit for detecting a terminal voltage of the storage battery 5 is constituted by the resistors 301 and 302. In this state, when the terminal voltage of the storage battery 5 rises, a voltage at a point A for interconnecting the resistors 301 and 302 connected to the Zener diode 306 increases. As the result, the Zener diode 306 and the transistor 307 become conductive while the output transistor 309 becomes non-conductive. Therefore, a field current in the field coil 102, the output voltage of the AC generator 1 and the terminal voltage of the storage battery 5 decrease. When the terminal voltage of the storage battery 5 decreases, a voltage at the point A drops, and the Zener diode 306 and the transistor 307 become non-conductive while the output transistor 309 becomes conductive. As the result, a field current in the field coil 102, the output output voltage of the AC generator 1 and the terminal voltage of the storage battery 5 increase. By repeating the above operation, the output voltage of the AC generator 1 is adjusted to a second regulated voltage value of 14.5 V, for example.

When the lamp switch 7 is turned on, the output of the lamp detection means 4 becomes low (low potential). Thereby, the transistor 305 becomes non-conductive and the circuit for detecting a terminal voltage of the storage battery 5 is constituted by the divided voltage resistors 301 to 303. As the result, the output voltage of the AC generator 1 is adjusted to a first regulated voltage value lower than the second regulated voltage value, or 12.5 V, for example.

Since the conventional AC generator control unit for a vehicle is structured as above, when the lamp switch 7 is turned on, the output voltage of the AC generator 1 is lowered irrespective of the discharge state of the storage battery 5. Therefore, there is the possibility that a battery will die when an air-conditioner and other electric components are turned on.

To avoid such inconvenience, there is known an AC generator control unit for use in a vehicle as disclosed in JP-A-160043/1987 in which a reduction in the output voltage of the AC generator is prohibited when the output voltage of the AC generator has a ripple width larger than a predetermined value. However, this type of control unit is hardly employed immediately because it is difficult to set prohibition conditions as the ripple width is easily varied by vehicle conditions such as the capacity of the storage battery and the impedance of wiring from the output terminal of the AC generator to the storage battery and operation conditions such as the revolution speed of the AC generator.

This invention has been made to solve the above problems. Attention is paid to the fact that the duty ratio of a field current is varied in accordance with the discharge state of a storage battery without being affected by vehicle conditions and operation conditions. Therefore, it is an object of the invention to provide an AC generator control unit for a vehicle which makes it possible to improve the discharge efficiency of a storage battery and extend the service life of a vehicle lamp by detecting a duty ratio to prohibit a reduction in the output voltage of an AC generator.

According to the invention claimed in claim 1, there is provided an AC generator control unit for a vehicle which switches the output voltage of an AC generator to be regulated to a first regulated voltage value when the load of a vehicle lamp is input and to a second regulated voltage value higher than the first regulated voltage value when the load of a vehicle lamp is not input, the control unit comprising means for prohibiting the switching of the output voltage of the AC generator to be regulated to the first regulated voltage value when the duty ratio of a field current is higher than a predetermined duty ratio and switching to the second regulated voltage value.

According to the invention claimed in claim 2, there is provided an AC generator control unit for a vehicle which comprises means for switching between the first and second regulated voltage values as claimed in claim 1 by means of an ON/OFF signal from a lamp switch.

According to the invention claimed in claim 3, there is provided an AC generator control unit for a vehicle which comprises means for using a second predetermined duty ratio as the predetermined duty ratio as claimed in claim 1 when the load of a vehicle lamp is input, and for using the first predetermined duty ratio lower than the second predetermined duty ratio when the load of a vehicle lamp is not input.

According to the invention claimed in claim 4, there is provided an AC generator control unit for a vehicle which duty-controls a field current running through a field coil of the AC generator in accordance with a rectified output terminal voltage of the AC generator driven by a vehicle to start power generation so as to regulate the output voltage of the AC generator, the control unit comprising means for switching the output voltage of the AC generator to be regulated to the first regulated voltage value when the duty ratio of a field current is lower than a predetermined duty ratio and to the second regulated voltage value higher than the first regulated voltage value when the duty ratio is higher than the predetermined duty ratio.

According to the invention claimed in claim 1, while the load of a vehicle lamp is input, a duty ratio for turning on and off a field current is detected. When the detected duty ratio is higher than a predetermined duty ratio, switching for voltage regulation is prohibited and the output voltage of the AC generator is switched from the first regulated voltage value to the second regulated voltage value. When the detected duty ratio is lower than the predetermined duty ratio, switching for voltage regulation is permitted and the output voltage of the AC generator is switched from the second regulated voltage value to the first regulated voltage value, thereby reducing voltage supplied to a vehicle lamp as a load and extending the service life of each of the lamps without deteriorating the charging condition of the storage battery.

According to the invention claimed in claim 2, switching between the first regulated voltage value and the second regulated voltage value is performed by an ON/OFF signal from the lamp switch, thereby making it possible to utilize the lamp switch generally provided in a vehicle, which is economically advantageous.

According to the invention claimed in claim 3, flickering of a vehicle lamp caused by an increased load resulted by lighting the lamp can be eliminated by employing the first predetermined duty ratio when the load of a vehicle lamp is not input and the second predetermined duty ratio higher than the first predetermined duty ratio when the load of a vehicle lamp is input.

According to the invention claimed in claim 4, when the detected duty ratio is higher than a predetermined duty ratio, the output voltage of the AC generator is first adjusted to the second regulated voltage value. Thereby, when the discharge amount of the storage battery is large, the output voltage of the AC generator becomes high and the service life of each of the vehicle lamps can be extended without deteriorating the charging condition of the storage battery.

The above and other objects, features and advantages of the invention will become more apparent from the following description when taken in conjunction with the accompanying drawings.

BRIEF DESCRIPTION OF THE DRAWINGS

FIG. 2 is a table showing the output voltage of the AC generator of Embodiment 1;

DESCRIPTION OF THE PREFERRED EMBODIMENT

The present invention is further illustrated by Examples with reference to the accompanying drawings in which the same elements are given the same reference codes as those of the prior art.

Embodiment 1

Figure 1:
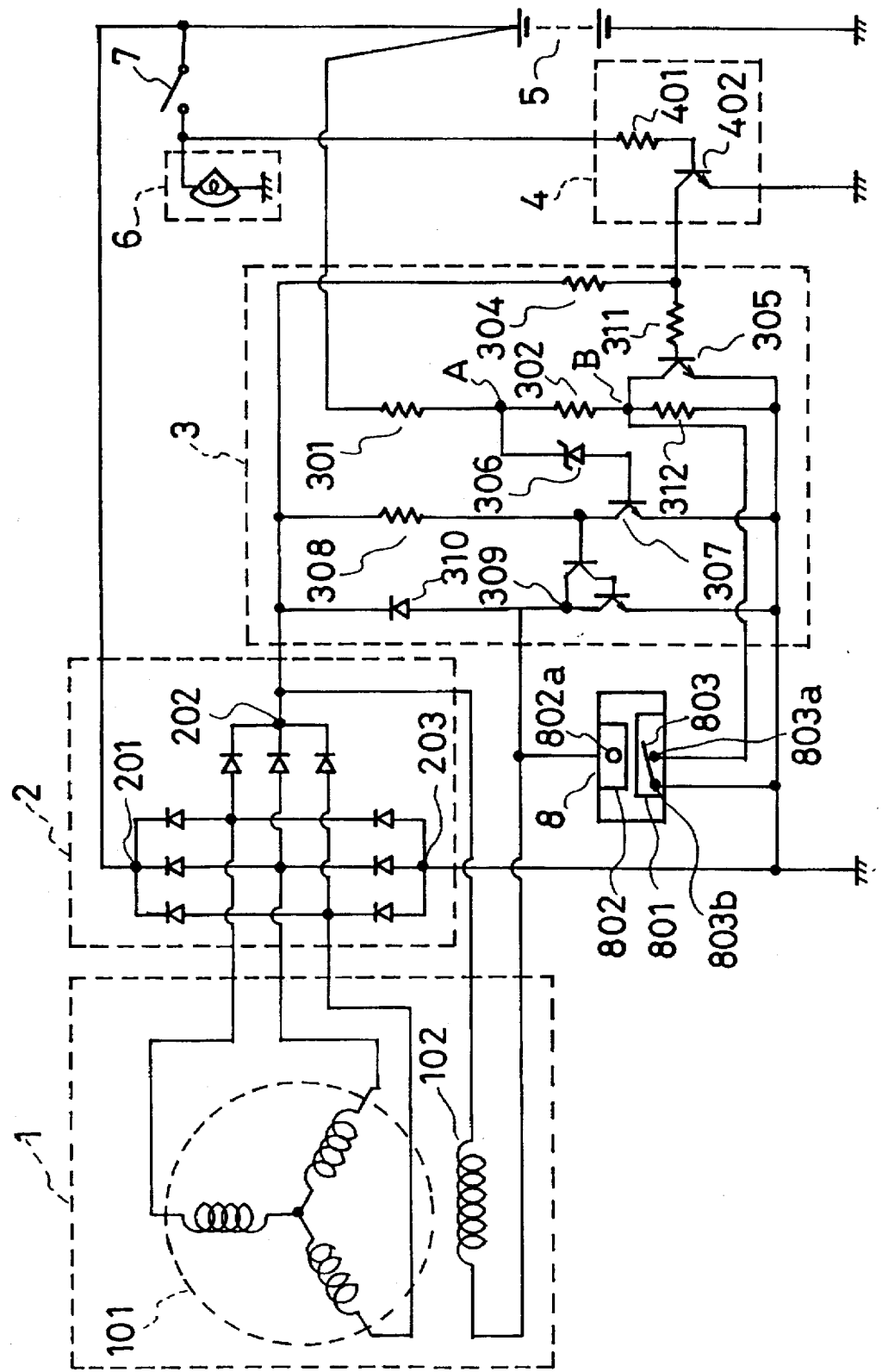
FIG. 1 is a circuit diagram of Embodiment 1 of the present invention.
Figure 5:
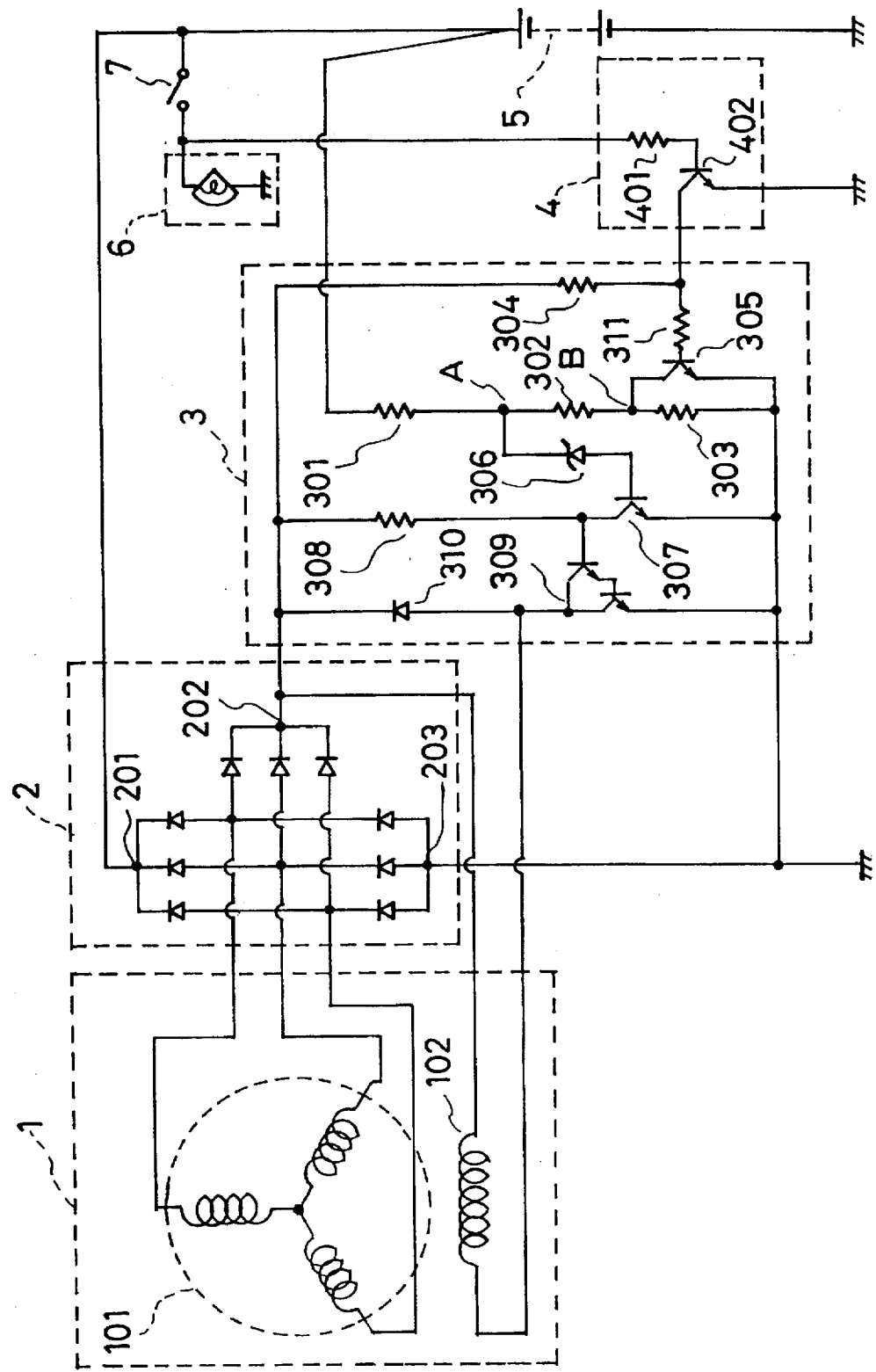
FIG. 5 is a circuit diagram of the control unit of the prior art.

FIG. 1 is a circuit diagram of an AC generator control unit for a vehicle according to Embodiment 1 of the present invention. In FIG. 1, reference numeral 312 represents a resistor provided in place of the resistor 303 to have a resistance value smaller than that of the resistor 303 shown in FIG. 5. This resistor 312 is intended to change the first regulated voltage from the conventional 12.5 V to 13.5 V in consideration of the charging efficiency of the storage battery 5. To a point B between the resistor 312 and the resistor 302 are connected the collector of the transistor 305 and the output port 801 of a duty detector 8. This output port 801 incorporates a switch 803 which is turned on and off by an output from the input port 802 of the duty detector 8. The fixed terminal 803a of this switch 803 is connected to the point B and the movable terminal 803b of the switch 803 is grounded. The above input port 802 is connected to a wiring for connecting one end of the field coil 102 to a connection point between the output transistor 309 and the diode 310, and incorporates a decision circuit 802a. A predetermined duty ratio as a decision value is set in this decision circuit 802a for detecting a duty ratio of a field current input from the input port 802. When the detected duty ratio is higher than the above predetermined duty ratio, the decision circuit 802a outputs an ON signal for ON operation to the switch 803 of the output port 801 which in turns grounds the point B. When the decision circuit 802a does not output the ON signal, the switch 803 returns to an OFF state by itself.

A description is subsequently given of the operation of this Embodiment 1. When the lamp switch 7 is turned on, the transistor 402 becomes conductive, the output of the lamp detection means 4 becomes low, and the transistor 305 becomes non-conductive. In this state, when the duty ratio of a field current is lower than the predetermined duty ratio, the circuit for detecting a terminal voltage of the storage battery 5 is constituted by resistors 301, 302 and 312 since the point B is not grounded by the duty detector 8. Thereby, the output voltage of the AC generator 1 is adjusted to a first regulated voltage value lower than the second regulated voltage value, or 13.5 V, for example.

While the lamp switch 7 is turned on, when the duty ratio of a field current is higher than the predetermined duty ratio, the circuit for detecting a terminal voltage of the storage battery 5 is constituted by the resistors 301 and 302 since the point B is grounded by the duty detector 8. Thereby, the output voltage of the AC generator 1 is adjusted to a second regulated voltage value of 14.5 V, for example.

Meanwhile, when the lamp switch 7 is turned off, the output voltage of the AC generator 1 and the terminal voltage of the storage battery 5 decrease as the voltage of the point A increases, irrespective of the duty ratio of a field current, like the prior art as described above, and the output voltage of the AC generator 1 and the terminal voltage of the storage battery 5 increase as the voltage of the point A decreases due to a reduction in the terminal voltage of the storage battery 5. By repeating this process, the output voltage of the AC generator 1 is adjusted to a second regulated voltage value of 14.5 V, for example.

In short, according to this Embodiment 1, when the lamp switch 7 is turned on and the duty ratio of a field current is higher than the predetermined duty ratio, the discharge of the storage battery 5 is large. Therefore, since switching the output voltage of the AC generator 1 to a low voltage is prohibited by means of the lamp detection means 4, voltage applied to the lamp 6 is properly reduced without impairing charging efficiency of the storage battery 5 and the service life of each of the lamps can be extended.

The relationship among the ON/OFF (high potential/low potential) operation of the lamp detection means 4, the duty ratio of a field current and the output voltage (control voltage) of the AC generator 1 is shown in FIG. 2. In this FIG. 2, DF is a duty ratio detected by the duty detector 8 and DF1 is a predetermined duty ratio.

In this Embodiment 1, the switch 803 is illustrated as a mechanical switch having a movable contact, but if an electrical switch such as a transistor is used, its switching function can be extended.

Embodiment 2

Figure 3:
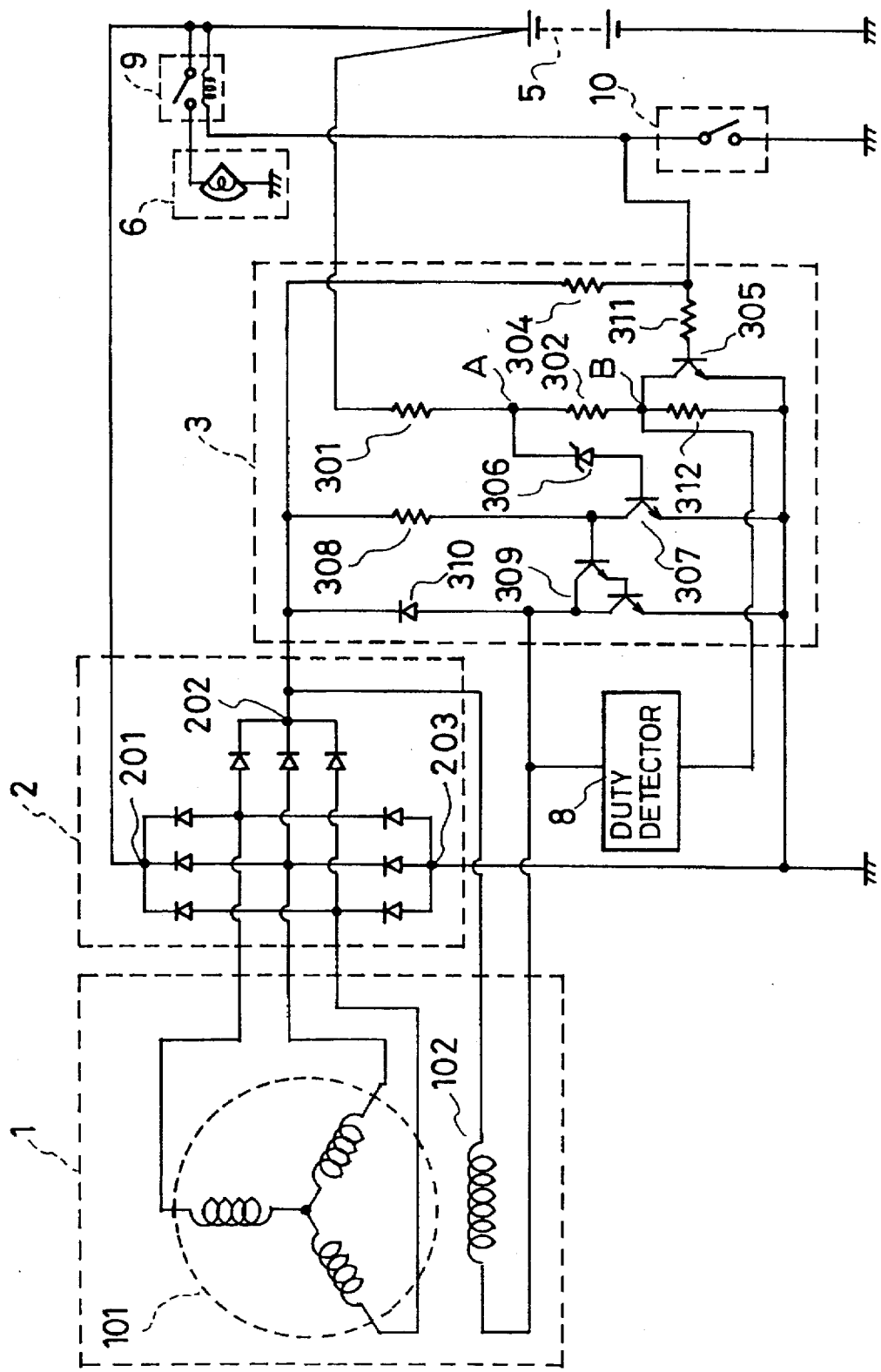
FIG. 3 is a circuit diagram of Embodiment 2 of the present invention.

In the above Embodiment 1, the lamp detection means 4 is formed of the transistor 402 which becomes conductive when it detects a terminal voltage of the lamp 6. As shown in FIG. 3, when a lamp switch 10 is used as the lamp detection means 4 and a relay 9 which is turned on and off by the ON/OFF operation of the lamp switch 10 is replaced for the lamp switch 7 of the above Embodiment 1, the same effect as in Embodiment 1 can be obtained.

Embodiment 3

Figure 4:
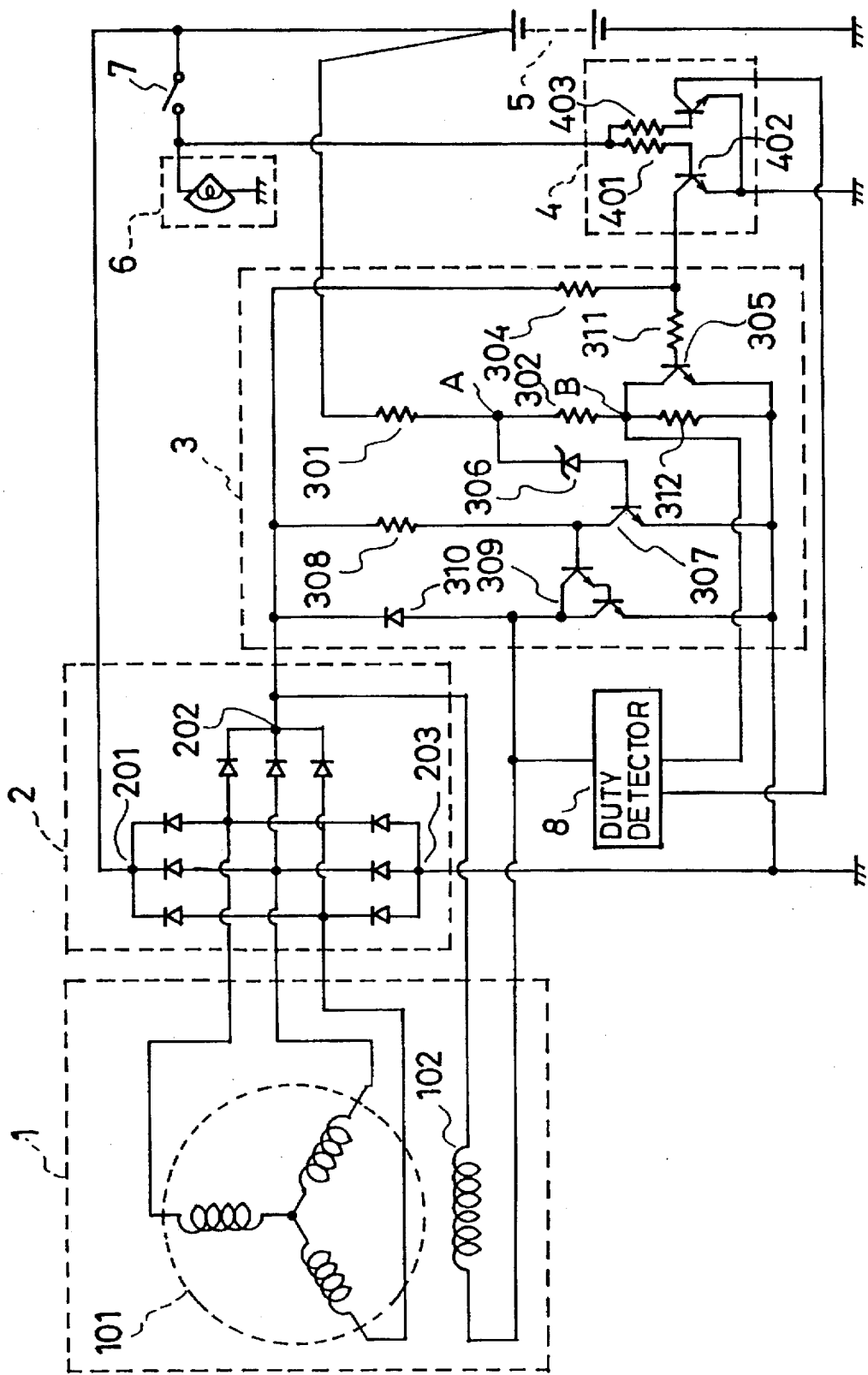
FIG. 4 is a circuit diagram of Embodiment 3 of the present invention.

The predetermined duty ratio which is a decision value of the duty detector 8 in the above Embodiments may be changed according to the presence and absence of the lamp as shown in FIG. 4. That is, the predetermined duty ratio in the duty detector 8 when the lamp is present is taken as DF2 and the predetermined duty ratio when the lamp is absent is taken as DF3. The predetermined duty ratio DF2 when the lamp is present is set to be higher than the predetermined duty ratio DF3 when the lamp is absent (DF2>DF3), thereby suppressing changes in the output of the duty detector 8 caused by an increase in the duty ratio of a field current resulted by lighting the lamp 6. In concrete terms, when the output of the duty detector 8 is low, that is, the detected duty ratio is smaller than the predetermined duty ratio, a regulated voltage is switched from the second regulated voltage value (14.5 V) to the first regulated voltage value (13.5 V) by lighting the lamp. Meanwhile, the detected duty ratio contributes to an increase in the load due to lighting of the lamp. At this point, when the detected duty ratio is higher than the predetermined duty ratio, the output of the duty detector 8 becomes high and a condition for prohibiting the switching from the second regulated voltage value to the first regulated voltage value is established. Thereby switching the regulated voltage from the first regulated voltage value to the second regulated voltage value, and a flickering phenomenon appears on the lamp 6. Therefore, flickering of the lamp 6 caused by an increased load resulted by lighting the lamp can be prevented by setting the predetermined duty ratio at the time of lighting the lamp to be higher than a decision value when the lamp is absent (DF2>DF3).

According to the present invention, the following effects can be obtained.

According to claim 1, since the output voltage of the AC generator is reduced only when the detected duty ratio of a field current is lower than a predetermined value while the load of a vehicle lamp is input, voltage applied to the lamp can be reduced without deteriorating the charging condition of the storage battery and the service life of the lamp can be extended, thereby improving quality reliability.

According to claim 2, since switching between the first regulated voltage value and the second regulated voltage value is performed by an ON/OFF signal from the lamp switch, it is economically advantageous to use the lamp switch generally provided in a vehicle.

According to claim 3, since a first predetermined duty ratio is used when the load of a vehicle lamp is not input and a second predetermined duty ratio higher than the first predetermined duty ratio is used when the load of the vehicle lamp is input, flickering of the vehicle lamp caused by an increased load resulted by lighting the lamp can be properly prevented.

According to claim 4, since the output voltage of the AC generator is adjusted to a second regulated voltage value higher than a first regulated voltage value when the detected duty ratio is higher than the predetermined value, the output of the AC generator is raised when the discharge amount of the storage battery is large, thereby extending the service life of the vehicle lamp.

What is claimed is:

1. A control unit for an AC generator which provides power to a battery, the AC generator having a field current running through a field coil and an output voltage adjusted by duty-controlling the field current according to a rectified output voltage of the AC generator, the control unit comprising:

means for switching, in response to a duty ratio of the field current of the AC generator being not higher than a predetermined duty ratio, the output voltage of the AC generator to a first regulated voltage value when a lamp load is applied to the battery;

means for switching, in response to a duty ratio of the field current of the AC generator being higher than the predetermined duty ratio, the output voltage of the AC generator to a second regulated voltage value higher than the first regulated voltage value when the lamp load is applied to the battery; and means for switching the output voltage of the AC generator to the second regulated voltage value without regard to the duty ratio of the field current of the AC generator when the lamp load is not applied to the battery.

2. The control unit according to claim 1, wherein switching between the first regulated voltage value and the second regulated voltage value is performed by an ON/OFF signal from a lamp load switch.

3. The control unit according to claim 1, further comprising:

means for using a second predetermined duty ratio as the predetermined duty ratio when the lamp load is applied to the battery, and using a first predetermined duty ratio as the predetermined duty ratio when the lamp load is not applied to the battery;

wherein the first predetermined duty ratio is lower than the second predetermined duty ratio.

4. A control unit for an AC generator which provides power to a battery, the AC generator having a field current running through a field coil and an output voltage adjusted by duty-controlling the field current according to a rectified output voltage of the AC generator, the control unit comprising:

means for switching the output voltage of the AC generator to a first regulated voltage value in response to a duty ratio of the field current being lower than a predetermined duty ratio; and means for switching the output voltage of the AC generator to a second regulated voltage value higher than the first regulated voltage value in response to the duty ratio being higher than the predetermined duty ratio.

5. A method for controlling an AC generator which provides power to a battery, the AC generator having a field current running through a field coil and an output voltage adjusted by duty-controlling the field current according to a rectified output voltage of the AC generator, the method comprising the steps of:

switching, in response to a duty ratio of the field current of the AC generator being not higher than a predetermined duty ratio, the output voltage of the AC generator to a first regulated voltage value when a lamp load is applied to the battery;

switching, in response to a duty ratio of the field current of the AC generator being higher than the predetermined duty ratio, the output voltage of the AC generator to a second regulated voltage value higher than the first regulated voltage value when the lamp load is applied to the battery; and switching the output voltage of the AC generator to the second regulated voltage value without regard to the duty ratio of the field current of the AC generator when the lamp load is not applied to the battery.

6. The method according to claim 5, wherein switching between the first regulated voltage value and the second regulated voltage value is performed by supplying an ON/OFF signal from a lamp load switch.

7. The method according to claim 5, further comprising the steps of:

using a second predetermined duty ratio as the predetermined duty ratio when the lamp load is applied to the battery; and using a first predetermined duty ratio as the predetermined duty ratio, lower than the second predetermined duty ratio, when the lamp load is not applied to the battery.

8. A method for controlling an AC generator which provides power to a battery, the AC generator having a field current running through a field coil and an output voltage adjusted by duty-controlling the field current according to a rectified output voltage of the AC generator, the method comprising the steps of:

switching the output voltage of the AC generator to a first regulated voltage value in response to a duty ratio of the field current being lower than a predetermined duty ratio; and switching the output voltage of the AC generator to a second regulated voltage value higher than the first regulated voltage value in response to the duty ratio being higher than the predetermined duty ratio.

\* \* \* \* \*